(12) United States Patent
Liu

(10) Patent No.: US 11,627,479 B2
(45) Date of Patent: Apr. 11, 2023

(54) METHODS AND APPARATUSES FOR SENDING AND READING CONFIGURATION PARAMETERS, BASE STATION AND USER EQUIPMENT

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 54 days.

(21) Appl. No.: 16/965,782

(22) PCT Filed: Jan. 31, 2018

(86) PCT No.: PCT/CN2018/074785
§ 371 (c)(1),
(2) Date: Jul. 29, 2020

(87) PCT Pub. No.: WO2019/148385
PCT Pub. Date: Aug. 8, 2019

(65) Prior Publication Data
US 2021/0051492 A1    Feb. 18, 2021

(51) Int. Cl.
*H04W 24/02* (2009.01)
*H04W 76/27* (2018.01)
(Continued)

(52) U.S. Cl.
CPC ........... *H04W 24/02* (2013.01); *H04L 1/1812* (2013.01); *H04L 5/0053* (2013.01); *H04W 76/27* (2018.02)

(58) Field of Classification Search
CPC . H04L 5/0073; H04L 27/2666; H04L 5/0092; H04B 7/045
See application file for complete search history.

(56) References Cited

U.S. PATENT DOCUMENTS

2012/0155272 A1  6/2012  Quan et al.
2012/0320847 A1  12/2012 Nam et al.
(Continued)

FOREIGN PATENT DOCUMENTS

CN    103338518 A    10/2013
CN    103688504 A    3/2014
(Continued)

OTHER PUBLICATIONS

State Intellectual Property Office of the People's Republic of China, Office Action and Search Report Issued in Application No. 2018800000690, dated Sep. 2, 2020, 18 pages.
(Continued)

*Primary Examiner* — Ayaz R Sheikh
*Assistant Examiner* — Debebe A Asefa
(74) *Attorney, Agent, or Firm* — Finnegan, Henderson, Farabow, Garrett & Dunner, L.L.P.

(57) ABSTRACT

A method for sending configuration parameters includes: classifying a configuration parameter set into an information element structure, wherein the information element structure includes at least one information element used to carry configuration parameters in the configuration parameter set; adding the information element structure to a radio resource control RRC message; when UE establishes a low-latency and high-reliability service request, sending, to the UE, the RRC message including the information element structure.

8 Claims, 5 Drawing Sheets

(51) Int. Cl.
*H04L 1/18* (2006.01)
*H04L 5/00* (2006.01)
*H04L 1/1812* (2023.01)

(56) References Cited

U.S. PATENT DOCUMENTS

| | | |
|---|---|---|
| 2014/0226581 A1 | 8/2014 | Nam et al. |
| 2015/0131582 A1 | 5/2015 | Nam et al. |
| 2015/0257094 A1 | 9/2015 | Wei et al. |
| 2015/0304860 A1 | 10/2015 | Liu et al. |
| 2018/0160418 A1 | 6/2018 | Luo et al. |
| 2018/0262398 A1* | 9/2018 | Chen ................ H04L 41/0836 |
| 2018/0270853 A1* | 9/2018 | Hosseini ............ H04L 1/1893 |
| 2019/0387479 A1* | 12/2019 | Gong ................ H04W 52/242 |
| 2020/0235874 A1* | 7/2020 | Yeo .................. H04L 5/0051 |

FOREIGN PATENT DOCUMENTS

| | | |
|---|---|---|
| CN | 106102180 A | 11/2016 |
| CN | 106211332 A | 12/2016 |
| CN | 106341839 A | 1/2017 |
| CN | 106604330 A | 4/2017 |
| CN | 106921477 A | 7/2017 |
| CN | 107113895 A | 8/2017 |
| EP | 2536244 A1 | 12/2012 |
| WO | WO 2013/006196 A1 | 1/2013 |
| WO | WO 2017/195702 A1 | 11/2017 |

OTHER PUBLICATIONS

ISA State Intellectual Property Office of the People's Republic of China, Written Opinion of the International Searching Authority Issued in Application No. PCT/CN2018/074785, dated Oct. 31, 2018, 9 pages.

ISA State Intellectual Property Office of the People's Republic of China, International Search Report Issued in Application No. PCT/CN2018/074785, dated Oct. 31, 2018, WIPO, 4 pages.

Huawei (Rapporteur), "Introduction of NB-IoT", 3GPP TSG-RAN WG2 Meeting #93, R2-162068, St. Julian's, Malta, Feb. 15-19, 2016, 287 pages.

Guo, Haitao et al., "PDCP Layer of TD-LTE System Analysis and Realization of Confirmation Mode", Communication & Information Technology, Mar. 2013, 13 pages.

* cited by examiner

METHODS AND APPARATUSES FOR SENDING AND READING CONFIGURATION PARAMETERS, BASE STATION AND USER EQUIPMENT

CROSS REFERENCE TO RELATED APPLICATIONS

This application is a national phase application based on International Application No. PCT/CN2018/074785, filed Jan. 31, 2018, the content of which is incorporated herein by reference.

TECHNICAL FIELD

The present disclosure relates to the field of communication technology, and in particular, to methods and apparatuses for sending and reading configuration parameters, a base station, user equipment and a computer readable storage medium.

BACKGROUND

The continuous emergence of new Internet applications puts forward higher requirements for wireless communication technology, driving the continuous evolution of the wireless communication technology to meet the needs of the applications. At present, cellular mobile communication technology is in the evolution stage of a new generation of technology. An important feature of the new generation of technology is to support the flexible configuration of multiple service types. In a recent $3^{rd}$ Generation Partnership Project (3GPP) discussion, high-reliability services have been approved, and ultra reliable (UR) is a subject to be researched following a Long Term Evolution (LTE) system and a $5^{th}$ generation mobile communication technology (5G) system. Moreover, the ultra reliable and low latency usually represent a large class of service requirements. For the high-reliability services, new technology is introduced into a physical layer, and new downlink control information (DCI) is determined.

However, by the above manner, it is difficult to meet the requirements for 5G high-reliability transmission at the edge of a cell.

SUMMARY

In view of this, the present application discloses methods and apparatuses for sending and reading configuration parameters, a base station, user equipment and a computer readable storage medium to give parameters in cooperation with a physical layer, increase air interface efficiency and achieve the requirement of realizing 5G high-reliability transmission at the edge of a cell.

According to a first aspect of examples of the present disclosure, there is provided a method for sending configuration parameters. The method is applied to a base station, and includes:

classifying a configuration parameter set into an information element structure, wherein the information element structure includes at least one information element used to carry configuration parameters in the configuration parameter set;

adding the information element structure to a radio resource control RRC message;

when user equipment UE establishes a low-latency and high-reliability service request, sending, to the UE, the RRC message including the information element structure.

In an example, the information element includes a category identifier, and the category identifier is used to indicate whether configuration parameters carried by a corresponding information element belong to cell common parameters or UE specific parameters.

In an example, the configuration parameter set includes at least one of the following:

uplink transmission parameter information, downlink transmission parameter information, period information, repetition parameters determined for a repetition manner introduced into a physical layer, power offset information, an additional reference signal, hybrid automatic repeat request HARQ parameters or other parameters.

According to a second aspect of the examples of the present disclosure, there is provided a method for reading configuration parameters. The method is applied to user equipment UE, and includes:

receiving, from a base station, a radio resource control RRC message including an information element structure, wherein the information element structure includes at least one information element used to carry configuration parameters in a configuration parameter set;

parsing the information element structure from the RRC message;

reading the configuration parameters from the information element structure and storing the configuration parameters.

In an example, reading the configuration parameters from the information element structure and storing the configuration parameters includes:

reading, from the information element structure, a category identifier of each information element and configuration parameters carried by the information element;

if the category identifier indicates that configuration parameters carried by a corresponding information element belong to UE specific parameters, storing corresponding configuration parameters in a first area.

In an example, reading the configuration parameters from the information element structure and storing the configuration parameters further includes:

if the category identifier indicates that the configuration parameters carried by the corresponding information element belong to cell common parameters, storing corresponding configuration parameters in a second area, wherein the second area has a different storage structure from the first area.

In an example, the configuration parameter set includes at least one of the following:

uplink transmission parameter information, downlink transmission parameter information, period information, repetition parameters determined for a repetition manner introduced into a physical layer, power offset information, an additional reference signal, hybrid automatic repeat request HARQ parameters or other parameters.

According to a third aspect of the examples of the present disclosure, there is provided an apparatus for sending configuration parameters. The apparatus is applied to a base station, and includes:

an classifying module configured to classify a configuration parameter set into an information element structure, wherein the information element structure includes at least one information element, and the information element is used to carry configuration parameters in the configuration parameter set;

an adding module configured to add, to a radio resource control RRC message, the information element structure into which the classifying module classifies the configuration parameter set;

a sending module configured to, when user equipment UE establishes a low-latency and high-reliability service request, send, to the UE, the RRC message including the information element structure.

In an example, the information element includes a category identifier, and the category identifier is used to indicate whether configuration parameters carried by a corresponding information element belong to cell common parameters or UE specific parameters.

In an example, the configuration parameter set includes at least one of the following:

uplink transmission parameter information, downlink transmission parameter information, period information, repetition parameters determined for a repetition manner introduced into a physical layer, power offset information, an additional reference signal, hybrid automatic repeat request HARQ parameters or other parameters.

According to a fourth aspect of the examples of the present disclosure, there is provided an apparatus for reading configuration parameters. The apparatus is applied to user equipment UE, and includes:

a receiving module configured to receive, from a base station, a radio resource control RRC message including an information element structure, wherein the information element structure includes at least one information element used to carry configuration parameters in a configuration parameter set;

a parsing module configured to parse the information element structure from the RRC message received by the receiving module;

a reading and storing module configured to read the configuration parameters from the information element structure parsed by the parsing module and store the configuration parameters.

In an example, the reading and storing module includes:

a reading submodule configured to read, from the information element structure, a category identifier of each information element and configuration parameters carried by the information element;

a first storing submodule configured to, if the category identifier read by the reading submodule indicates that configuration parameters carried by a corresponding information element belong to UE specific parameters, store corresponding configuration parameters in a first area.

In an example, the reading and storing module further includes:

a second storing submodule configured to, if the category identifier read by the reading submodule indicates that the configuration parameters carried by the corresponding information element belong to cell common parameters, store corresponding configuration parameters in a second area, wherein the second area has a different storage structure from the first area.

In an example, the configuration parameter set includes at least one of the following:

uplink transmission parameter information, downlink transmission parameter information, period information, repetition parameters determined for a repetition manner introduced into a physical layer, power offset information, an additional reference signal, hybrid automatic repeat request HARQ parameters or other parameters.

According to a fifth aspect of the examples of the present disclosure, there is provided a base station, including:

a processor; and
a memory for storing processor executable instructions, wherein the processor is configured to:

classify a configuration parameter set into an information element structure, wherein the information element structure includes at least one information element used to carry configuration parameters in the configuration parameter set;

add the information element structure to a radio resource control RRC message;

when user equipment UE establishes a low-latency and high-reliability service request, send, to the UE, the RRC message including the information element structure.

According to a sixth aspect of the examples of the present disclosure, there is provided user equipment, including:

a processor; and
a memory for storing processor executable instructions, wherein the processor is configured to:

receive, from a base station, a radio resource control RRC message including an information element structure, wherein the information element structure includes at least one information element used to carry configuration parameters in a configuration parameter set;

parse the information element structure from the RRC message;

read the configuration parameters from the information element structure and store the configuration parameters.

According to a seventh aspect of the examples of the present disclosure, there is provided a computer readable storage medium having computer instructions stored thereon, wherein the instructions are executed by a processor to perform steps in the method for sending configuration parameters as described above.

According to an eighth aspect of the examples of the present disclosure, there is provided a computer readable storage medium having computer instructions stored thereon, wherein the instructions are executed by a processor to perform steps in the method for reading configuration parameters as described above.

The technical solutions provided by the examples of the present disclosure may include the following beneficial effects.

By classifying the configuration parameter set into the information element structure, adding the information element structure to the RRC message, and sending, to the UE, the RRC message including the information element structure, the relevant parameter configuration is given in cooperation with the physical layer, and the requirement of realizing 5G high-reliability transmission at the edge of a cell is achieved.

By receiving, from the base station, the RRC message including the information element structure, parsing the information element structure from the RRC message, reading the configuration parameters from the information element structure and storing the configuration parameters, relevant operations may be performed according to the stored configuration parameters after parsing DCI subsequently, and the requirement of realizing 5G high-reliability transmission at the edge of a cell is achieved.

It should be understood that the above general description and the following detailed description are only exemplary and explanatory and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
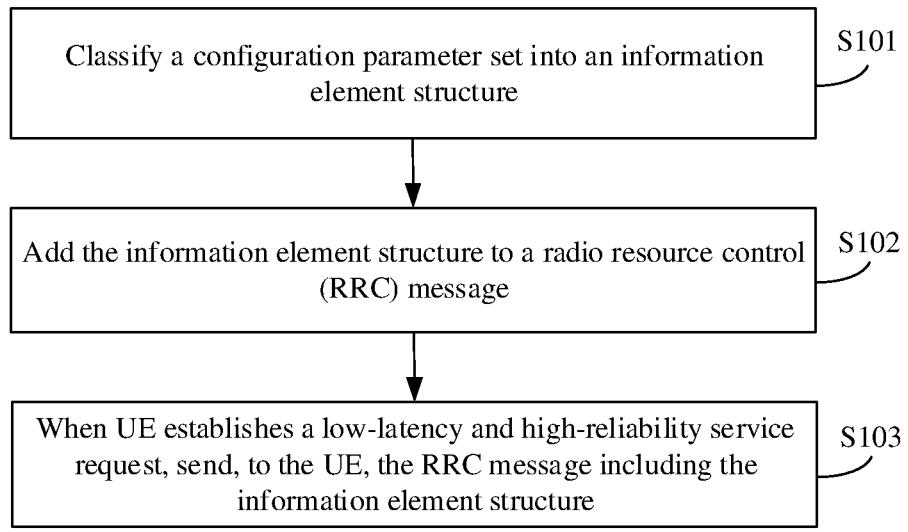
FIG. 1 is a flowchart illustrating a method for sending configuration parameters according to an example of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

FIG. 1 is a flowchart illustrating a method for sending configuration parameters according to an example of the present disclosure. This example is described in the perspective of a base station side. As shown in FIG. 1, the method for sending the configuration parameters includes the following blocks.

At block S101, a configuration parameter set is classified into an information element structure. The information element structure includes at least one information element used to carry configuration parameters in the configuration parameter set.

The configuration parameter set may include at least one of uplink transmission parameter information, downlink transmission parameter information, period information, repetition parameters determined for a repetition manner introduced into a physical layer, power offset information, an additional reference signal, hybrid automatic repeat request (HARQ) parameters or other parameters. In this example, limited enumeration-type repetition parameters may be determined for the repetition manner introduced into the physical layer, and one repetition parameter may be selected therefrom during configuration.

The information element is a data structure that may be used to carry the configuration parameters. Optionally, the information element may include a category identifier. The category identifier is used to indicate whether configuration parameters carried by a corresponding information element belong to cell common parameters or UE specific parameters.

At block S102, the information element structure is added to a radio resource control (RRC) message.

In order to better meet the requirement of high-reliability transmission, by adding the information element structure to the RRC message, this example achieves the purpose that a higher layer cooperates with the physical layer to give relevant parameter configuration.

At block S103, when UE establishes a low-latency and high-reliability service request, the RRC message including the information element structure is sent to the UE.

In the above example, by classifying a configuration parameter set into an information element structure, adding the information element structure to an RRC message, and sending the RRC message including the information element structure to UE, a higher layer can cooperate with the physical layer to give the relevant parameter configuration, and the requirement of realizing 5G high-reliability transmission at the edge of a cell is achieved.

Figure 2:
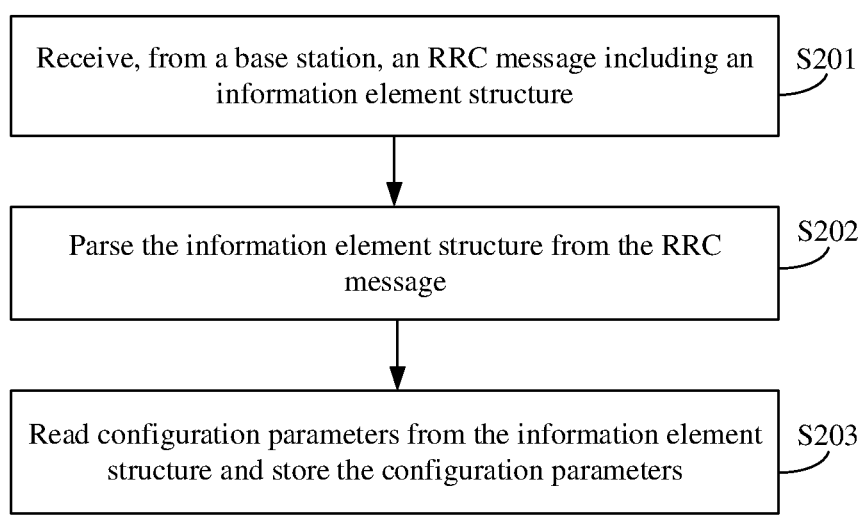
FIG. 2 is a flowchart illustrating a method for reading configuration parameters according to an example of the present disclosure.

FIG. 2 is a flowchart illustrating a method for reading configuration parameters according to an example of the present disclosure. This example is described in the perspective of a UE side. As shown in FIG. 2, the method includes the following blocks.

At block S201, an RRC message including an information element structure is received from a base station. The information element structure includes at least one information element used to carry configuration parameters in a configuration parameter set.

The configuration parameter set may include at least one of uplink transmission parameter information, downlink transmission parameter information, period information, repetition parameters determined for a repetition manner introduced into a physical layer, power offset information, an additional reference signal, hybrid automatic repeat request (HARQ) parameters or other parameters. In this example, limited enumeration-type repetition parameters may be determined for the repetition manner introduced into the physical layer, and one repetition parameter may be selected therefrom during configuration.

At block S202, the information element structure is parsed from the RRC message.

At block S203, the configuration parameters are read from the information element structure, and the configuration parameters are stored.

In this example, a category identifier of each information element and configuration parameters carried by the information element may be read from the information element structure. If the category identifier indicates that configuration parameters carried by a corresponding information element belong to UE specific parameters, the corresponding configuration parameters are stored in a first area.

In addition, if the category identifier indicates that the configuration parameters carried by the corresponding information element belong to cell common parameters, the corresponding configuration parameters are stored in a second area. The second area has a different storage structure from the first area. That is, the UE stores the UE specific parameters and the cell common parameters in different storage structures.

In the above example, by receiving, from a base station, an RRC message including an information element structure, parsing the information element structure from the RRC message, reading configuration parameters from the information element structure and storing the configuration parameters, relevant operations may be performed according to the stored configuration parameters after parsing DCI subsequently, and the requirement of realizing 5G high-reliability transmission at the edge of a cell is achieved.

Figure 3:
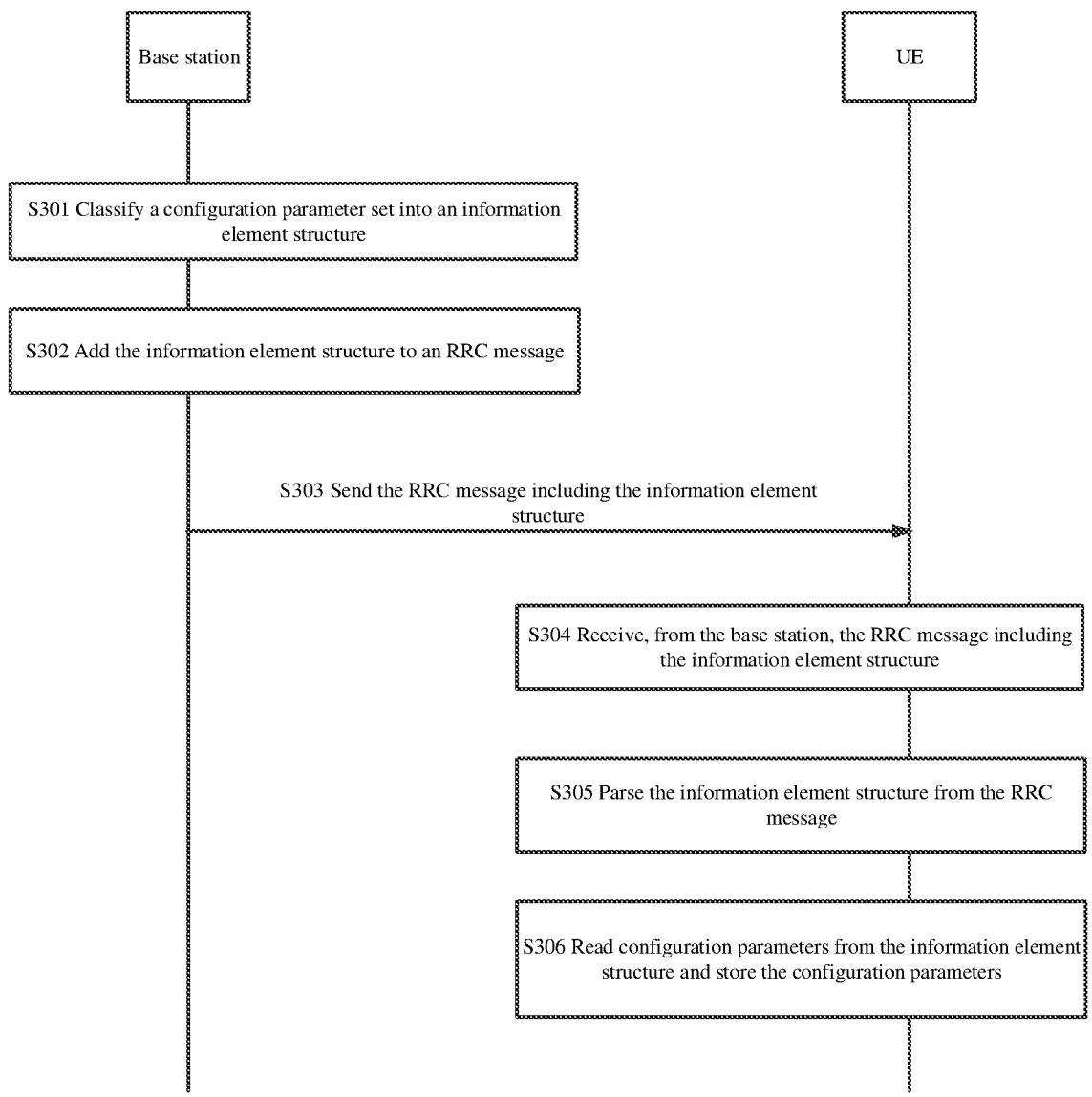
FIG. 3 is a signaling flowchart illustrating a method for reading configuration parameters according to an example of the present disclosure.

FIG. 3 is a signaling flowchart illustrating a method for reading configuration parameters according to an example of the present disclosure. This example is described from the perspective of interaction between UE and a base station. As shown in FIG. 3, the method includes the following blocks.

At block S301, the base station classifies a configuration parameter set into an information element structure which includes at least one information element used to carry configuration parameters in the configuration parameter set.

The configuration parameter set may include at least one of uplink transmission parameter information, downlink transmission parameter information, period information, repetition parameters determined for a repetition manner introduced into a physical layer, power offset information, an additional reference signal, hybrid automatic repeat request HARQ parameters or other parameters.

At block S302, the base station adds the information element structure to an RRC message.

At block S303, when the UE establishes a low-latency and high-reliability service request, the base station sends the RRC message including the information element structure to the UE.

At block S304, the UE receives the RRC message including the information element structure from the base station.

At block S305, the UE parses the information element structure from the RRC message.

At block S306, the UE reads the configuration parameters from the information element structure and stores the configuration parameters.

In the above example, the interaction between the UE and the base station enables the base station to cooperate with a physical layer at an RRC layer to give relevant parameter configuration, so that the UE may read the configuration parameters from the information element structure and store the configuration parameters. Therefore, relevant operations may be performed according to the stored configuration parameters after parsing DCI subsequently, and the requirement of realizing 5G high-reliability transmission at the edge of a cell is achieved.

Figure 4:
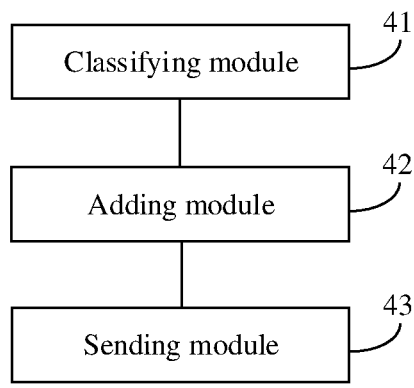
FIG. 4 is a block diagram illustrating an apparatus for sending configuration parameters according to an example of the present disclosure.

FIG. 4 is a block diagram illustrating an apparatus for sending configuration parameters according to an example of the present disclosure. This example is described from the perspective of a base station side. As shown in FIG. 4, the apparatus includes: a classifying module 41, an adding module 42 and a sending module 43.

The classifying module 41 is configured to classify a configuration parameter set into an information element structure. The information element structure includes at least one information element used to carry configuration parameters in the configuration parameter set.

The configuration parameter set may include at least one of the following: uplink transmission parameter information, downlink transmission parameter information, period information, repetition parameters determined for a repetition manner introduced into a physical layer, power offset information, an additional reference signal, hybrid automatic repeat request (HARQ) parameters or other parameters. In this example, limited enumeration-type repetition parameters may be determined for the repetition manner introduced into the physical layer, and one repetition parameter may be selected therefrom during configuration.

The information element is a data structure that may be used to carry the configuration parameters. Optionally, the information element may include a category identifier. The category identifier is used to indicate whether configuration parameters carried by a corresponding information element belong to cell common parameters or UE specific parameters.

The adding module 42 is configured to add, to a radio resource control RRC message, the information element structure into which the classifying module 41 classifies the configuration parameter set.

In order to better meet the requirement of high-reliability transmission, by adding the information element structure to the RRC message, this example achieves the purpose that a higher layer cooperates with the physical layer to give relevant parameter configuration.

The sending module 43 is configured to, when UE establishes a low-latency and high-reliability service request, send, to the UE, the RRC message including the information element structure added by the adding module 42.

In the above example, by classifying the configuration parameter set into the information element structure, adding the information element structure to the RRC message, and sending, to the UE, the RRC message including the information element structure, the higher layer cooperates with the physical layer to give relevant parameter configuration, and the requirement of realizing 5G high-reliability transmission at the edge of a cell is achieved.

Figure 5:
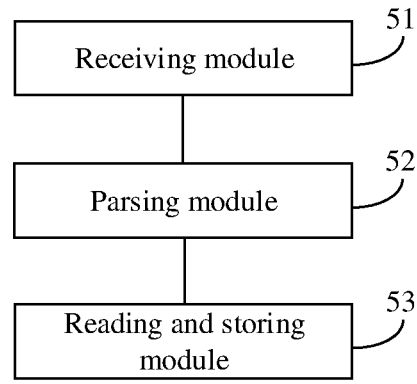
FIG. 5 is a block diagram illustrating an apparatus for reading configuration parameters according to an example of the present disclosure.

FIG. 5 is a block diagram illustrating an apparatus for reading configuration parameters according to an example of the present disclosure. This example is described from the perspective of a UE side. As shown in FIG. 5, the apparatus includes: a receiving module 51, a parsing module 52 and a reading and storing module 53.

The receiving module 51 is configured to receive, from a base station, a radio resource control RRC message including an information element structure, wherein the information element structure includes at least one information element used to carry configuration parameters in a configuration parameter set.

The configuration parameter set may include at least one of the following: uplink transmission parameter information, downlink transmission parameter information, period information, repetition parameters determined for a repetition manner introduced into a physical layer, power offset information, an additional reference signal, hybrid automatic repeat request (HARQ) parameters or other parameters. In this example, limited enumeration-type repetition parameters may be determined for the repetition manner introduced into the physical layer, and one repetition parameter may be selected therefrom during configuration.

The parsing module 52 is configured to parse the information element structure from the RRC message received by the receiving module 51.

The reading and storing module 53 is configured to read the configuration parameters from the information element structure parsed by the parsing module 52 and store the configuration parameters.

In this example, a category identifier of each information element and configuration parameters carried by the information element may be read from the information element structure. If the category identifier indicates that configuration parameters carried by a corresponding information element belong to UE specific parameters, corresponding configuration parameters are stored in a first area.

In addition, if the category identifier indicates that the configuration parameters carried by the corresponding information element belong to cell common parameters, corresponding configuration parameters are stored in a second area. The second area has a different storage structure from the first area. That is, UE stores the UE specific parameters and the cell common parameters in different storage structures.

In the above example, by receiving, from the base station, the RRC message including the information element structure, parsing the information element structure from the RRC message, reading the configuration parameters from the information element structure and storing the configuration parameters, relevant operations may be performed according to the stored configuration parameters after parsing DCI subsequently, and the requirement of realizing 5G high-reliability transmission at the edge of a cell is achieved.

Figure 6:
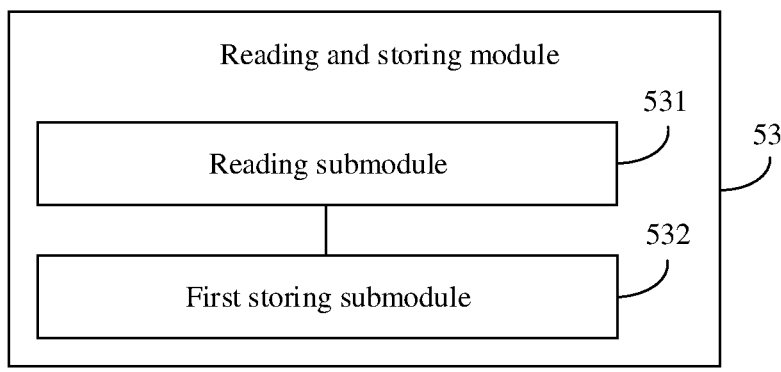
FIG. 6 is a block diagram illustrating another apparatus for reading configuration parameters according to an example of the present disclosure.

FIG. 6 is a block diagram illustrating another apparatus for reading configuration parameters according to an example of the present disclosure. As shown in FIG. 6, based on the example shown in FIG. 5, the reading and storing module 53 may include the following submodules.

The reading submodule 531 is configured to read, from the information element structure, a category identifier of each information element and configuration parameters carried by the information element.

The first storing submodule 532 is configured to, if the category identifier read by the reading submodule 531 indicates that configuration parameters carried by a corresponding information element belong to UE specific parameters, store corresponding configuration parameters in a first area.

In this example, a category identifier of each information element and configuration parameters carried by the information element may be read from the information element structure. If the category identifier indicates that configuration parameters carried by a corresponding information element belong to UE specific parameters, corresponding configuration parameters are stored in a first area.

In the above example, by reading, from the information element structure, the category identifier of each information element and the configuration parameters carried by the information element, and when the read category identifier indicates that the configuration parameters carried by the corresponding information element belong to the UE specific parameters, storing the corresponding configuration parameters in the first area, the UE specific parameters are stored in corresponding area.

Figure 7:
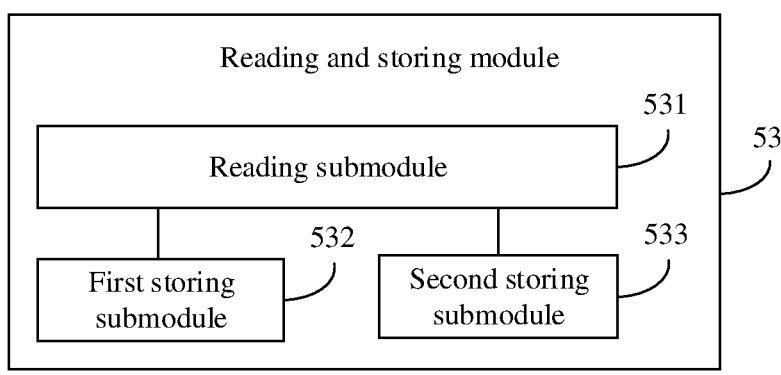
FIG. 7 is a block diagram illustrating another apparatus for reading configuration parameters according to an example of the present disclosure.

FIG. 7 is a block diagram illustrating another apparatus for reading configuration parameters according to an example of the present disclosure. As shown in FIG. 7, based on the example shown in FIG. 6, the reading and storing module 53 may also include the following submodules.

The second storing submodule 533 is configured to, if the category identifier read by the reading submodule 531 indicates that the configuration parameters carried by the corresponding information element belong to cell common parameters, store corresponding configuration parameters in a second area, wherein the second area has a different storage structure from the first area.

In this example, a category identifier of each information element and configuration parameters carried by the information element may be read from the information element structure. If the category identifier indicates that the configuration parameters carried by the corresponding information element belong to cell common parameters, corresponding configuration parameters are stored in a second area. The second area has a different storage structure from the first area. That is, UE stores the UE specific parameters and the cell common parameters in different storage structures.

In the above example, by reading, from the information element structure, the category identifier of each information element and the configuration parameters carried by the information element, and when the read category identifier indicates that the configuration parameters carried by the corresponding information element belong to the cell common parameters, storing the corresponding configuration parameters in the second area, the cell common parameters are stored in corresponding area.

Figure 8:
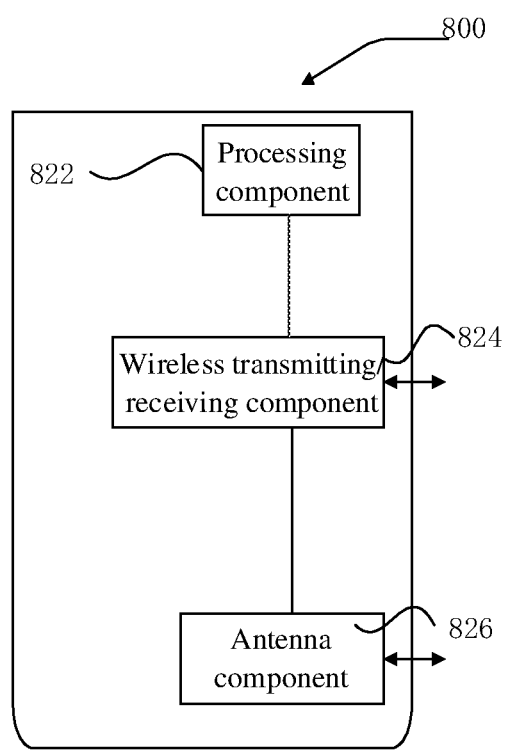
FIG. 8 is a block diagram illustrating an apparatus suitable for sending configuration parameters according to an example of the present disclosure.

FIG. 8 is a block diagram illustrating another apparatus suitable for sending configuration parameters according to an example of the present disclosure. The apparatus 800 may be provided as a base station. Referring to FIG. 8, the apparatus 800 includes a processing component 822, a wireless transmitting/receiving component 824, an antenna component 826, and a signal processing portion specific to a wireless interface. The processing component 822 may further include one or more processors.

One of the processors in the processing component 822 may be configured to:

classify a configuration parameter set into an information element structure, wherein the information element structure includes at least one information element used to carry configuration parameters in the configuration parameter set;

add the information element structure to a radio resource control RRC message;

send, to UE, the RRC message including the information element structure.

In an example, there is also provided a non-transitory computer readable storage medium including instructions, wherein the instructions are executable by the processing component 822 of the apparatus 800 to perform the method for sending the configuration parameters as described above. For example, the non-transitory computer readable storage medium may be a ROM, a random access memory (RAM), a CD-ROM, a magnetic tape, a floppy disk, and an optical data storage device.

Figure 9:
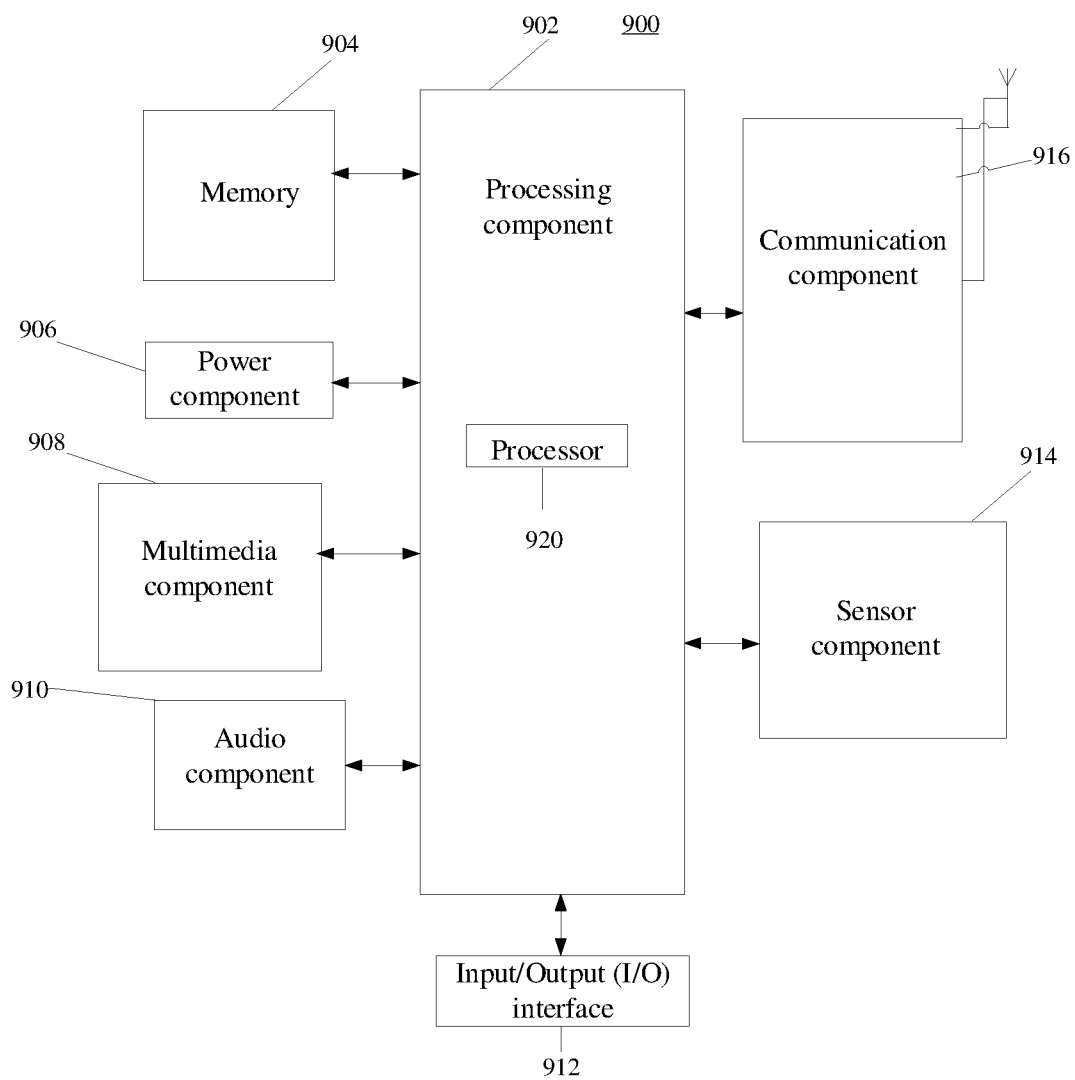
FIG. 9 is a block diagram illustrating an apparatus suitable for reading configuration parameters according to an example of the present disclosure.

FIG. 9 is a block diagram illustrating an apparatus suitable for reading configuration parameters according to an example of the present disclosure. For example, the apparatus 900 may be a mobile phone, a computer, a digital broadcast terminal, a messaging device, a game console, a tablet device, a medical equipment, a fitness equipment, a personal digital assistant or other user equipment.

Referring to FIG. 9, the apparatus 900 may include one or more of the following components: a processing component 902, a memory 904, a power component 906, a multimedia component 908, an audio component 910, an input/output (I/O) interface 912, a sensor component 914, and a communication component 916.

The processing component 902 usually controls the overall operation of the apparatus 900, such as operations associated with display, telephone calls, data communications, camera operations, and recording operations. The processing component 902 may include one or more processors 920 to execute instructions to perform all or part of the blocks in the methods described above. Moreover, the processing component 902 may include one or more modules to facilitate interaction between the processing component 902 and other components. For example, the processing component 902 may include a multimedia module to facilitate interaction between the multimedia component 908 and the processing component 902.

One of the processors 920 in the processing component 902 may be configured to:

receive, from a base station, a radio resource control RRC message including an information element structure, wherein the information element structure includes at least one information element used to carry configuration parameters in a configuration parameter set;

parse the information element structure from the RRC message;

read the configuration parameters from the information element structure and store the configuration parameters.

The memory 904 is configured to store various types of data to support operation at the apparatus 900. Examples of these data include instructions for any application or method operating at the apparatus 900, contact data, phone book data, messages, pictures, videos, and the like. The memory 904 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 906 provides power to various components of the apparatus 900. The power component 906 may include a power management system, one or more power sources, and other components associated with power generating, management, and distribution for the apparatus 900.

The multimedia component 908 includes a screen that provides an output interface between the apparatus 900 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 908 includes a front camera and/or a rear camera. When the apparatus 900 is in an operation mode, such as a shooting mode or a video mode, the front camera and/or the rear camera may receive external multimedia data. Each of the front and rear cameras may be a fixed optical lens system or have a focal length and an optical zoom capability.

The audio component 910 is configured to output and/or input audio signals. For example, the audio component 910 includes a microphone (MIC) configured to receive an external audio signal when the apparatus 900 is in an operation mode, such as a call mode, a recording mode, and a voice recognition mode. The received audio signal may be further stored in the memory 904 or transmitted via the communication component 916. In some examples, the audio component 910 also includes a loudspeaker for outputting an audio signal.

The I/O interface 912 provides an interface between the processing component 902 and a peripheral interface module which may be a keyboard, a click wheel, a button, or the like. These buttons may include, but are not limited to a home button, a volume button, a start button, and a lock button.

The sensor component 914 includes one or more sensors for providing a status assessment in various aspects to the apparatus 900. For example, the sensor component 914 may detect an open/closed state of the apparatus 900, and the relative positioning of components, for example, the component is a display and a keypad of the apparatus 900. The sensor component 914 may also detect a change in position of the apparatus 900 or a component of the apparatus 900, the presence or absence of a user in contact with the apparatus 900, the orientation or acceleration/deceleration of the apparatus 900 and a change in temperature of the apparatus 900. The sensor component 914 may include a proximity sensor configured to detect the presence of nearby objects without any physical contact. The sensor component 914 may also include a light sensor, such as a CMOS or CCD image sensor, for use in imaging applications. In some examples, the sensor component 914 may also include an acceleration sensor, a gyro sensor, a magnetic sensor, a pressure sensor, or a temperature sensor.

The communication component 916 is configured to facilitate wired or wireless communication between the apparatus 900 and other devices. The apparatus 900 may access a wireless network based on a communication standard, such as WiFi, 2G or 3G, or a combination thereof. In an example, the communication component 916 receives broadcast signals or broadcast associated information from an external broadcast management system via a broadcast channel In an example, the communication component 916 also includes a near field communication (NFC) module to facilitate short range communication. For example, the NFC module may be implemented based on a radio frequency identification (RFID) technology, an infrared data association (IrDA) technology, an ultra wide band (UWB) technology, a Bluetooth (BT) technology, and other technologies.

In an example, the apparatus 900 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing the above methods.

In an example, there is also provided a non-transitory computer readable storage medium including instructions, such as the memory 904 including instructions, wherein the instructions are executable by the processor 920 of the apparatus 900 to perform the method as described above. For example, the non-transitory computer readable storage medium may be a ROM, a random access memory (RAM), a CD-ROM, a magnetic tape, a floppy disk, and an optical data storage device.

For the apparatus examples, since they basically correspond to the method examples, reference may be made to the partial description of the method examples. The apparatus examples described above are merely illustrative, wherein the units described as separate components may or may not be physically separated, and the components displayed as units may or may not be physical units, i.e., may be located in one place or may be distributed to multiple network units. Some or all of the modules may be selected according to actual needs to achieve the objectives of the present disclosure. Those of ordinary skill in the art can understand and implement the present disclosure without any creative effort.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

Other embodiments of the present disclosure will be readily apparent to those skilled in the art after considering the specification and practicing the contents disclosed herein. The present application is intended to cover any variations, uses, or adaptations of the present disclosure, which follow the general principle of the present disclosure and include common knowledge or conventional technical means in the art that are not disclosed in the present disclosure. The specification and examples are to be regarded as illustrative only. The true scope and spirit of the present disclosure are pointed out by the following claims.

It is to be understood that the present disclosure is not limited to the precise structures that have described and shown in the drawings, and various modifications and changes can be made without departing from the scope thereof. The scope of the disclosure is to be limited only by the appended claims.

The invention claimed is:

1. A method for sending configuration parameters, wherein the method is applied to a base station, and comprises:
    classifying a configuration parameter set into an information element structure, wherein the information element structure comprises at least one information element configured to carry configuration parameters in the configuration parameter set;
    adding the information element structure to a radio resource control (RRC) message; and
    when user equipment (UE) establishes a low-latency and high-reliability service request, sending the RRC message comprising the information element structure to the UE,
    wherein the information element comprises a category identifier, and the category identifier is configured to indicate whether configuration parameters carried by a corresponding information element belong to cell common parameters or UE specific parameters, so that the UE stores, based on the category identifier, the configuration parameters which belong to the UE specific parameters in a first area, and stores the configuration parameters which belong to the cell common parameters in a second area, wherein the second area has a different storage structure from the first area.

2. The method according to claim 1, wherein the configuration parameter set comprises at least one of:
    uplink transmission parameter information, downlink transmission parameter information, period information, repetition parameters determined for a repetition manner introduced into a physical layer, power offset information, an additional reference signal, or hybrid automatic repeat request (HARQ) parameters.

3. A method for reading configuration parameters, wherein the method is applied to user equipment (UE), and comprises:
    receiving, from a base station, a radio resource control (RRC) message comprising an information element structure, wherein the information element structure comprises at least one information element configured to carry configuration parameters in a configuration parameter set;
    parsing the information element structure from the RRC message; and
    reading the configuration parameters from the information element structure and storing the configuration parameters,
    wherein the information element comprises a category identifier, and the category identifier is configured to indicate whether configuration parameters carried by a corresponding information element belong to cell common parameters or UE specific parameters, and
    wherein reading the configuration parameters from the information element structure and storing the configuration parameters comprises:
        reading, from the information element structure, the category identifier of each information element and the configuration parameters carried by the information element;
        if the category identifier indicates that the configuration parameters carried by the corresponding information element belong to the UE specific parameters, storing the configuration parameters carried by the corresponding information element in a first area; and
        if the category identifier indicates that the configuration parameters carried by the corresponding information element belong to the cell common parameters, storing the configuration parameters carried by the corresponding information element in a second area, wherein the second area has a different storage structure from the first area.

4. The method according to claim 3, wherein the configuration parameter set comprises at least one of:
    uplink transmission parameter information, downlink transmission parameter information, period information, repetition parameters determined for a repetition manner introduced into a physical layer, power offset information, an additional reference signal, or hybrid automatic repeat request (HARQ) parameters.

5. A base station, comprising:
    a processor; and
    a memory for storing processor executable instructions, wherein the processor is configured to:
    classify a configuration parameter set into an information element structure, wherein the information element structure comprises at least one information element configured to carry configuration parameters in the configuration parameter set;
    add the information element structure to a radio resource control (RRC) message; and
    when user equipment (UE) establishes a low-latency and high-reliability service request, send the RRC message comprising the information element structure to the UE,
    wherein the information element comprises a category identifier, and the category identifier is configured to indicate whether configuration parameters carried by a corresponding information element belong to cell common parameters or UE specific parameters, so that the UE stores, based on the category identifier, the configuration parameters which belong to the UE specific parameters in a first area, and stores the configuration parameters which belong to the cell common parameters in a second area, wherein the second area has a different storage structure from the first area.

6. The base station according to claim 5, wherein the configuration parameter set comprises at least one of:
    uplink transmission parameter information, downlink transmission parameter information, period information, repetition parameters determined for a repetition manner introduced into a physical layer, power offset information, an additional reference signal, or hybrid automatic repeat request (HARQ) parameters.

7. User equipment (UE), comprising:
a processor; and
a memory for storing processor executable instructions, wherein the processor is configured to:
receive, from a base station, a radio resource control (RRC) message comprising an information element structure, wherein the information element structure comprises at least one information element configured to carry configuration parameters in a configuration parameter set;
parse the information element structure from the RRC message; and
read the configuration parameters from the information element structure and store the configuration parameters,
wherein the information element comprises a category identifier, and the category identifier is configured to indicate whether configuration parameters carried by a corresponding information element belong to cell common parameters or UE specific parameters,
wherein in reading the configuration parameters from the information element structure and storing the configuration parameters, the processor is further configured to:

read, from the information element structure, the category identifier of each information element and the configuration parameters carried by the information element;
if the category identifier indicates that the configuration parameters carried by the corresponding information element belong to the UE specific parameters, store the configuration parameters carried by the corresponding information element in a first area; and
if the category identifier indicates that the configuration parameters carried by the corresponding information element belong to the cell common parameters, store the configuration parameters carried by the corresponding information element in a second area, wherein the second area has a different storage structure from the first area.

8. The UE according to claim 7, wherein the configuration parameter set comprises at least one of:
uplink transmission parameter information, downlink transmission parameter information, period information, repetition parameters determined for a repetition manner introduced into a physical layer, power offset information, an additional reference signal, or hybrid automatic repeat request (HARQ) parameters.

* * * * *